US006209730B1

(12) United States Patent
Ewing

(10) Patent No.: US 6,209,730 B1
(45) Date of Patent: Apr. 3, 2001

(54) COMPACT DISK DISPLAY HOLDER

(76) Inventor: Robert Ewing, 7307 E. Manzanita Dr., Scottsdale, AZ (US) 85258

( * ) Notice: Subject to any disclaimer, the term of this patent is extended or adjusted under 35 U.S.C. 154(b) by 0 days.

(21) Appl. No.: 08/935,175

(22) Filed: Sep. 22, 1997

Related U.S. Application Data
(60) Provisional application No. 60/026,697, filed on Sep. 25, 1996.

(51) Int. Cl.[7] .................................................... A47G 29/00
(52) U.S. Cl. .......................... 211/40; 211/94.01; 312/9.1; 312/9.48
(58) Field of Search .................................. 211/40, 41.12, 211/94.01–94.02, 46, 50; 248/224.61; D6/407, 626; 312/9.1, 9.47, 9.48, 9.51–9.57; 206/307.1, 308.1; 40/124, 124.2, 124.4

(56) References Cited

U.S. PATENT DOCUMENTS

| | | | |
|---|---|---|---|
| 3,135,388 | * | 6/1964 | Lang . |
| 3,702,132 | * | 11/1972 | Fites et al. .............................. 211/40 |
| 4,358,018 | * | 11/1982 | Wolfe ................................. 211/41.12 |
| 4,462,498 | * | 7/1984 | Walker, Jr. ............................. 211/40 |
| 4,919,287 | * | 4/1990 | Haskett et al. ..................... 211/41.12 |
| 5,078,270 | * | 1/1992 | Campbell .......................... 211/41.12 |
| 5,105,952 | * | 4/1992 | Krattiger ................................ 211/40 |
| 5,148,925 | * | 9/1992 | Althoff et al. ......................... 211/40 |
| 5,341,942 | * | 8/1994 | James, Jr. .............................. 211/40 |
| 5,351,835 | * | 10/1994 | Hallgren ................................ 211/40 |
| 5,372,263 | * | 12/1994 | Niekel ................................ 211/41.12 |
| 5,394,996 | * | 3/1995 | Carpenter .......................... 211/94.01 |
| 5,485,926 | * | 1/1996 | Kundert ................................. 211/40 |
| 5,497,889 | * | 3/1996 | Genovesi ............................... 211/40 |
| 5,622,270 | * | 4/1997 | Bezos .................................... 211/40 |
| 5,628,414 | * | 5/1997 | Heathcote ............................. 211/40 |
| 5,667,083 | * | 9/1997 | Schnoor et al. ....................... 211/40 |
| 5,706,955 | * | 1/1998 | Andersson ............................ 211/40 |
| 5,921,404 | * | 7/1999 | Cooke et al. ......................... 211/40 |

OTHER PUBLICATIONS

Advertisement for Compact Disc Wall Case.

\* cited by examiner

*Primary Examiner*—Daniel P. Stodola
*Assistant Examiner*—Jennifer E. Novosad

(57) ABSTRACT

A device for holding and displaying compact disks (CD's) on a wall or other vertical face in a manner whereby the front covers of the CD's are constantly in view, and which simultaneously create a decorative montage on the wall. The device consists essentially of one or more straight rails of similar length which are capable of receiving and supporting the bottom edge of the CD cases; are positioned horizontally on the wall; are parallel to each other; and are separated vertically from each other by a distance sufficient to insert the tip of a finger to extract a CD from a rail. Each rail has a front wall, a bottom wall, and a back wall, which in combination forms a channel, and which flexibly grips a CD case causing the top of the case to touch the wall. The device further includes on each rail an outwardly protruding spring lip which guides the CD's into position as they are being inserted into the rail cavity. The CD's are positioned edge-to-edge on the rail with the front of the case facing outward.

15 Claims, 4 Drawing Sheets

COMPACT DISK DISPLAY HOLDER

Cross-Reference to Related Applications: This application claims the benefit of priority pursuant to 35 USC§119 (e)(1) from the provisional patent application filed pursuant to 35 USC§111(b); as Ser. No. 60/026,697 on Sep. 25, 1996.

BACKGROUND OF THE INVENTION

1 Field of the Invention

The invention herein relates to a means for storing as display items, compact disks (CD's) and more particularly to an attractive and economical, wall-mounted method of display that offers easy access to each CD while providing a full front display of each CD, multiples of which produce a decorative picture montage.

2 Overview of Prior Art

Compact disks for audio and computer use have gained greatly in popularity in recent years. Connoisseurs of music, computer programs and data, and computer games have a difficult time searching through stacks of compact disks (CD's) to find their desired CD selection because most storage and display apparatus show only the ends of the cases. Even with good vision, the small print on the ends of the cases is difficult to read from several feet away. The prior art designs are basically used for storing out of sight and transporting from place to place, rather than displaying for the artistic pleasure and convenient use of the CD's. They are generally complex designs which are visually obtrusive and which cover up a large portion of the front face of the CD making identification difficult The present invention is very simple in design and leaves all of the front face of the CD free of any cover except for a small strip at the base which lies behind the clear plastic rail. This portion is also highly legible. Therefore the present invention clearly displays the front side of the individual CD's, enabling the viewer to easily read the cover, thereby overcoming the problem of identification. The design and materials used in the preferred embodiment of the present invention, make the rail almost invisible from across a room and enable the user to display single or multiple rows of CD's on the wall surface of a room, creating a colorful, decorative, picture-like montage.

None of the prior art is designed such that they simultaneously show the graphic art front face of all of the stored CD's without having to look through some portion of the storage apparatus which obscures part of the front face, and none are sufficiently attractive that they would be chosen by a decorator to be used as an artistic wall display.

SUMMARY OF THE INVENTION

The object of the disclosed invention is to provide an efficiently recognizable, inexpensive means of displaying compact disks (CD's) in a manner that has the advantages of being both decoratively attractive while providing easy artistic recognition to the user. The invention includes one or more rails which are positioned horizontally on a wall and when a plurality of rails are used, they are situated substantially parallel to each other with a distance of slightly greater than the height of a CD case there between. A standard CD case's outside dimensions are 125 mm high by 142 mm wide by 10 mm thick (for a case that holds a single CD). The invention allows the CD's to be displayed on a wall or other flat surface with the jacket cover showing. The front cover or jacket of the CD contains the visual image most people use to identify the content of the CD held therein, and this front cover is typically comprised of an attractive graphic for the purpose of encouraging sales of the CD in the store. Therefore displaying the CD covers adds a decorative feature to walls unaccented by pictures or windows as well as affords the user or their guests easy access to their CD collection, whether music or computer CD's, with a simple glance at the wall. The simplicity of the rail design reduces the cost factors in the extrusion process, and thereby enables the production of a more economical product than prior patents provide.

DETAILED DESCRIPTION OF THE PREFERRED EMBODIMENT

Figure 1:
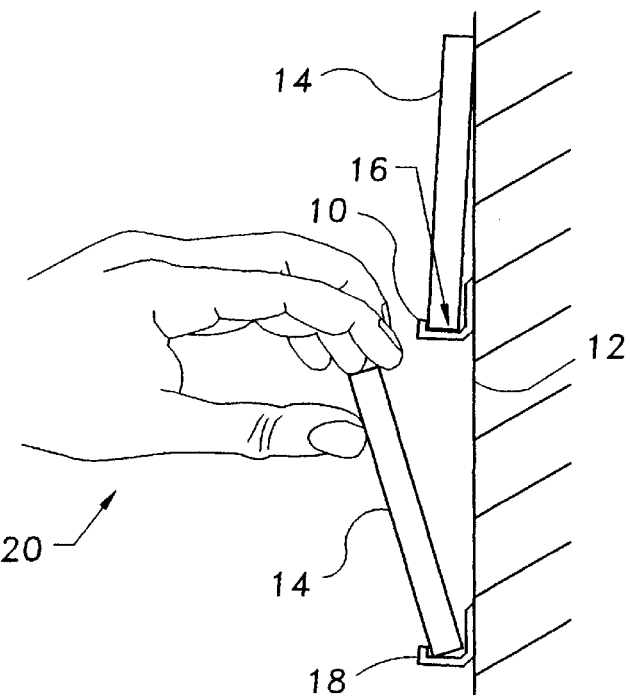
FIG. 1 is a side view of the disclosed invention as produced in accordance with one embodiment, showing two rows of CD's with one CD being located in the invention.

Referring to the drawings, a solution to the problem of locating specific music or computer compact disks (CD's) is shown in FIG. 1. CD cases are, with rare exception, packaged by the manufacturer in a standard plastic case of outside dimensions of 125 mm high by 142 mm wide by 10 mm thick. This consistency has led to the development of a variety of CD racks or holders. Most of such racks are free standing and utilize minimum space for maximum storage by "stacking" the CD cases showing only the 10 mm thick edge portion of the CD case. The deficiency in this system is the process of identifying the CD. Identification is typically made by the user's viewing the front cover of the CD case. In the existing products, the front of each case is blocked by the adjacent overlying CD case.

The invention disclosed herein utilizes a rail 10 which is fastened to the wall 12. The base of the CD case 14 is positioned within the channel 16 of the rail 10 and leaned up against the wall 12. Adjacent rails 18 which can be identical to the first rail 10, may be positioned parallel to the first rail 10, leaving sufficient room for the placement and removal of the CD case 14. FIG. 1 also shows the hand 20 of the user positioning or removing the CD case 14 from the adjacent rail 18 by tilting the CD case 14 forward to grasp and remove it from the invention. The placement of the CD case 14 is a reverse of the process with the base of the CD case 14 being placed in the adjacent rail 18 first and rotating the top of the CD back against the wall for storage. The base of the rail cavity is inclined slightly toward the wall 12 so that when the base of the CD case 14 is resting snugly in the rail channel 16, the top edge of the CD case 14 nearest the wall 12 is touching the wall. Upon contact with the wall 12, the CD case 14 is secured thereto by cradling it in the rail 10.

Figure 2:
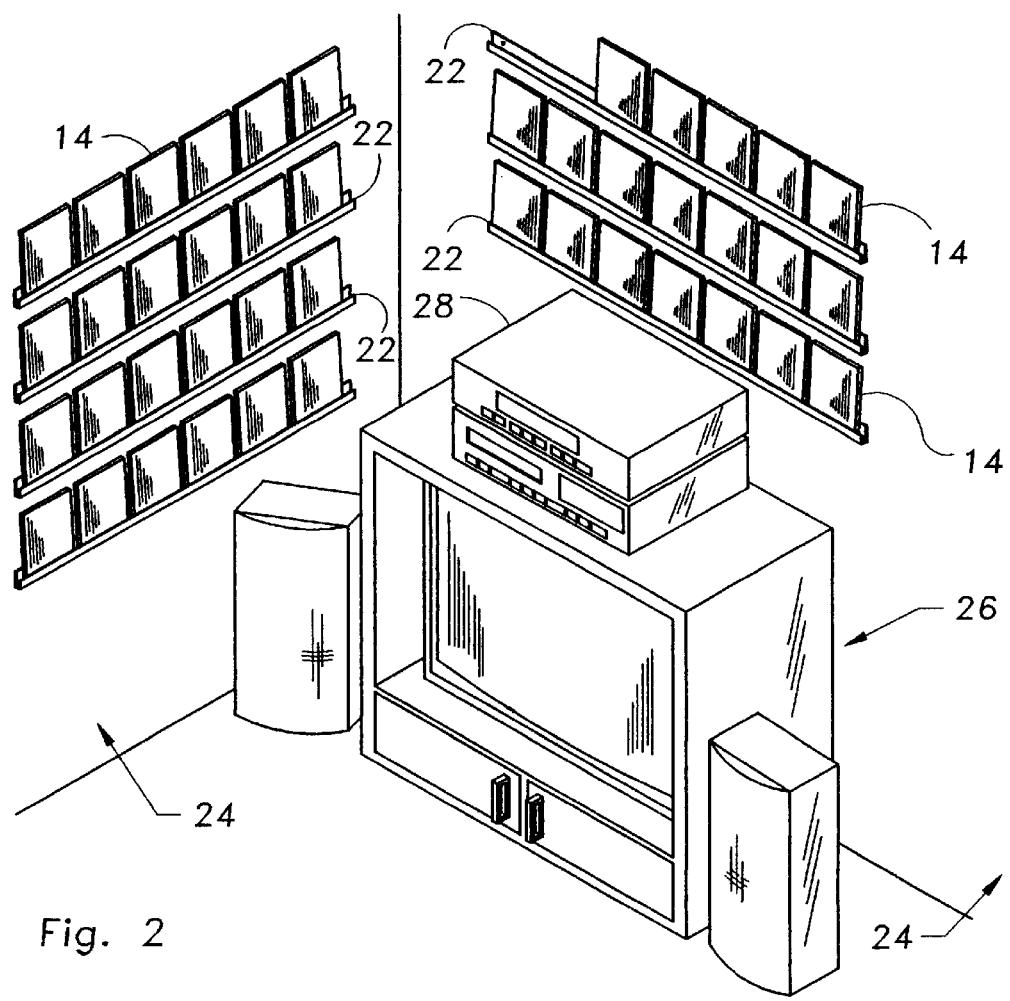
FIG. 2 is an isometric view of the device shown as it would be typically used in a dwelling and produced in accordance with the preferred embodiment of the present invention.

In FIG. 2 an isometric view of a typical application of the invention is shown. Here, the rails 22 are positioned substantially parallel to each other and secured to the wall 24 of a room, preferably near an entertainment center 26. This positioning allows close proximity of the CD's to the CD player 28 and with its unobstructed view, allows artist recognition at a glance by the user or their guests as they locate the CD of their choice.

The attractive covers of the CD's make up a colorful montage which provides a decorative addition to a wall of a room. A person's taste is reflected in his or her choice in a variety of art forms, including music. The visual art on the cover of the CD jacket is typically a representation of the "personality" of the music and therefore it is easy to imagine the aesthetic appeal of a montage of visual artwork to be displayed on the wall as a painting or print would be.

Figure 3:
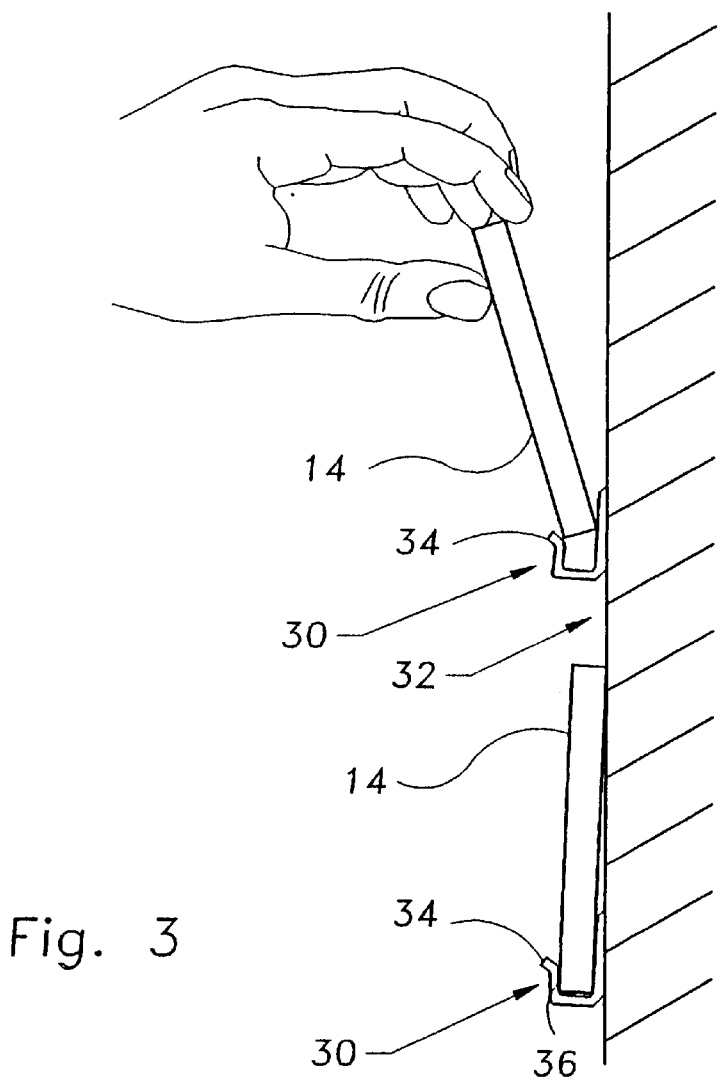
FIG. 3 is a side view of an alternate design of the disclosed invention as produced in accordance with the preferred embodiment showing two rows of CD's with one CD being located in the invention.

An alternative design to the afore disclosed is shown in FIG. 3. Here the CD case 14 is received by a clamping rail 30 in a similar form as previously disclosed. The rails 30 are also similarly positioned in a substantially parallel fashion to each other and fastened to the wall 32 thereby allowing the locating and removal of the CD cases 14 therefrom. The difference being the design of the clamping rail 30 in that it includes a lip 34 portion to facilitate the placement of the CD case 14 in the clamping rail 30 wherein the vertical extension 36 of the clamping rail 30 securely fits against the base of the CD case 14. This causes the CD case 14 to be firmly held when positioned therein.

Figure 4:
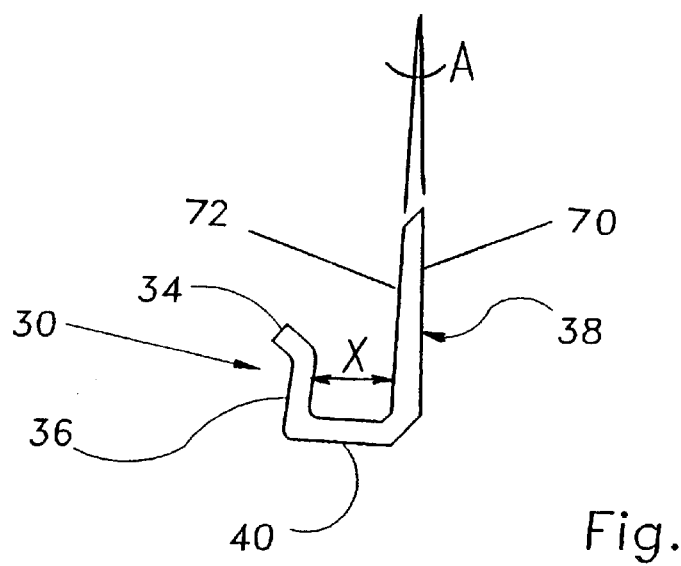
FIG. 4 is an enlarged side view of an alternative rail design as produced in accordance with the preferred embodiment of the present invention.

The invention as shown in FIG. 3 and described herein, is shown in greater detail in FIG. 4. Here the lip 34 is shown in greater detail as it extends out away from the back vertical portion 38. The back vertical portion 38 comprises a rear face 70 and a front face 72, whereby the front face 72 tapers upwardly and is inclined rearwardly, at A The rear face of the back vertical portion 38 is fastened flush to the wall and it supports the slightly inwardly inclined base 40 which positions the CD case in the clamping rail 30. The clamping portion is the vertical extension 36, which is disposed generally parallel to the front face of the back vertical portion 38 which when relaxed is distended toward the back vertical portion 38 such that the horizontal distance there between (x) is slightly less than the thickness of the CD case. The lip 34 protrudes away from the back vertical 38 to more easily facilitate the reception of the CD case therein. The spring-like flexion of the clamping rail 30 creates a mild compressive load on the base of the CD case when positioned therein thus mildly securing the case to the clamping rail 30.

The material specifications for the rail as described and shown in FIG. 1 are less stringent than for the clamping rail shown in FIG. 3 and 4 in that a mild spring tension with suitable memory is necessary for the clamping rail to function properly in the latter. Although the rails could be fabricated out of metal or wood, the transparent nature of polyethylene or polypropylene plastics makes them the preferred embodiment. Both materials have flexible properties with good memory when subjected to mild deformation.

Figure 5:
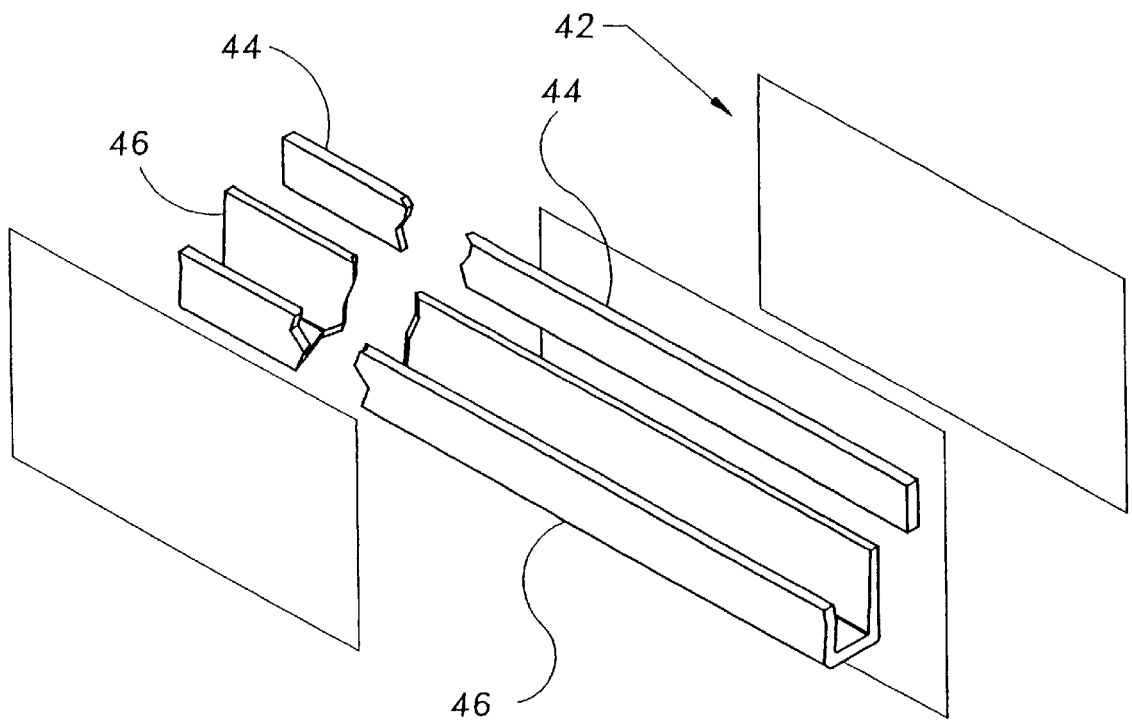
FIG. 5 is an isometric view showing a typical wall mounting option of the devise produced in accordance with the preferred embodiment of the present invention.

The invention is typically mounted on walls however as shown in FIG. 2, the rails can be attached to any flat surface. In FIG. 5 a mounting method is shown in which a cement or cinder block wall 42 is the flat surface of choice. These wall materials are sometimes found in college dormitory rooms, in basements and in other unfinished recreational rooms. Where fastening methods are not advantageous because of the difficulty in putting a threaded fastener into a hard surface such as a cement wall, an adhesive strip 44 can be used to secure the rail 46 to the wall 42.

Figure 6:
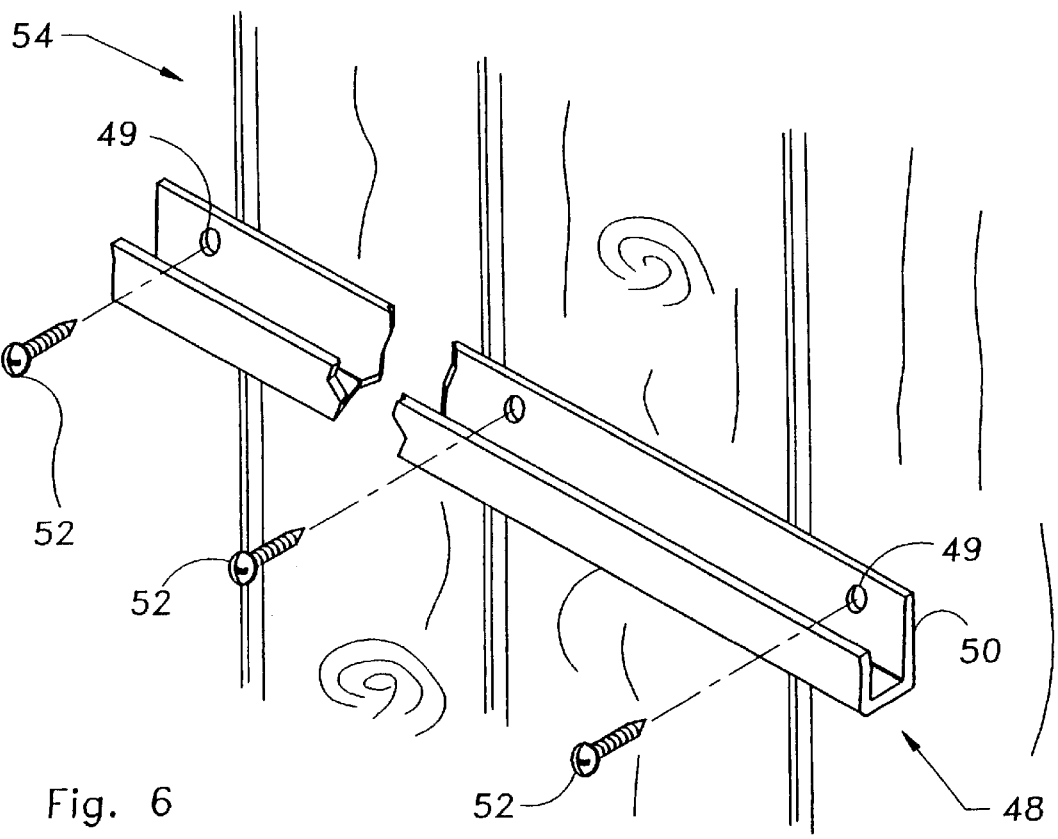
FIG. 6 is an isometric view showing an alternative wall mounting option of the devise produced in accordance with the preferred embodiment of the present invention.

This adhesive method of attachment can also be used with wooden frame paneled or drywall walls, but the screw fastener method as shown in FIG. 6 is usually preferable. In this case the rail 48 includes a plurality of holes 49 in the back vertical 50 of the rail 48 and screws 52 are used to secure the rail 50 to the wooden frame wall 54. In this case the screws 52 would typically be a self tapping or wood screw and would not require a pilot hole to be drilled into the wall before inserting the screws 52. Where very hard wood is used, or even in the earlier mentioned cement or cinder block walls, a pilot hole and specific fasteners can be used.

Figure 7:
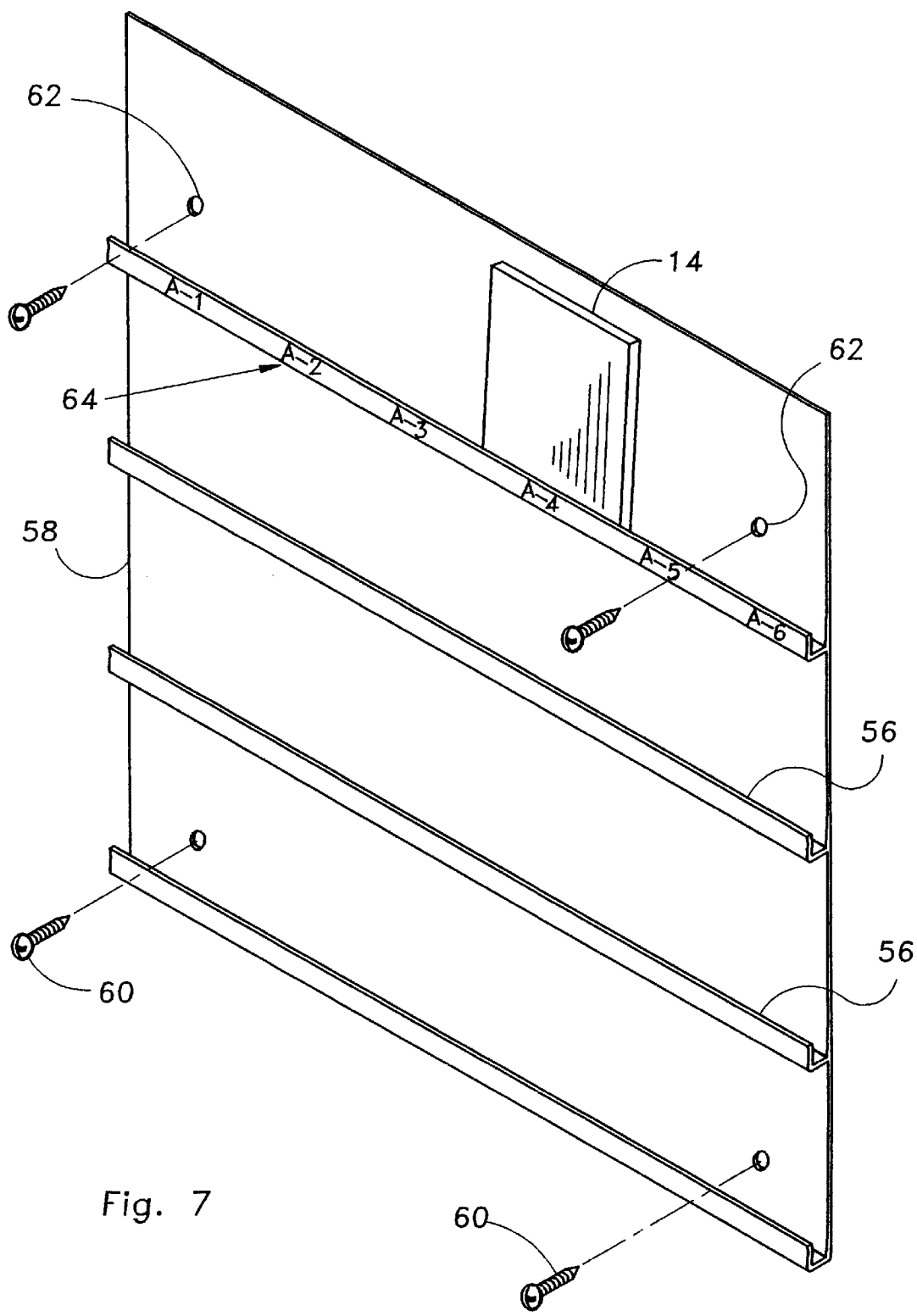
FIG. 7 is an alternative design in which a single unit includes a plurality of rows, each with an indexing code to identify specific CD's, the device being fastened to the wall in one of the disclosed methods.

The invention can also be expanded to include a plurality of rails 56 with a single back board 58 which in combination is then secured to a wall, as is shown in FIG. 7. Here the rails are functionally the same as previously described and can include the regular rail, the clamping rail, or a combination. The existence of the back-board 58 enables a series of parallel rails to be positioned on a wall in a single act. The back-board can be fastened to the wall with screws 60 inserted through holes 62 located in the back-board 58. The screw heads are covered by the CD cases 14 when positioned thereon.

What is claimed is:

1. In combination, at least one compact disk case defining a width and a compact disk storage device assembly comprising:
    (a) at least one longitudinal rail consisting of:
        (i) a horizontal base supporting said at least one case,
        (ii) a back portion extending vertically upwards from a first edge of said base, wherein said back portion comprises a front face and a rear face with said rear face being removably secured to a vertically extending wall surface in a substantially horizontal position by fastening means, whereby said rear face lies flush against the wall surface, and said front face tapers upwardly, towards the wall surface, from said first edge of said base to a top edge of said back portion, and
    (b) a clamping rail including:
        a resilient vertical extension disposed generally parallel to said front face and extending upwards from a second edge of said base with a lip extending upwardly and outwardly from a top edge of said vertical extension, wherein said back portion, said base, and said vertical extension together define a channel, having a width, which receives an edge of said at least one case, and the width of said channel is less than the width of said case so that the clamping rail provides pressure on said case to securely retain said case against said front face when said case is placed therein whereby a top portion of said case leans against the wall surface thereby allowing a cover of said case to be viewed.

2. The combination as in claim 1, wherein a height of said back portion extends above a height of said clamping rail.

3. The combination of claim 1, comprising a plurality of compact disk cases.

4. The combination of claim 1, wherein said fastening means comprises threaded fasteners.

5. The combination of claim 1, wherein said device is made from plastic.

6. The combination of claim 1, wherein said device is made from spring steel.

7. The combination of claim 1, further comprising a plurality of said longitudinal rails.

8. The combination of claim 1, wherein said fastening means comprises adhesive.

9. In combination, at least one compact disk case defining a width and a compact disk storage device assembly comprising:
   (a) a plurality of longitudinal rails, each of said rails consisting of:
      (i) a horizontal base supporting said at least one case,
      (ii) a back portion extending vertically upwards from a first edge of said base, wherein said back portion comprises a front face and a rear face with said rear face being removably secured to a vertically extending wall surface in a substantially horizontal position by fastening means, whereby said rear face lies flush against the wall surface, and said front face tapers upwardly, towards the wall surface, from said first edge of said base to a top edge of said back portion, and
   (b) a clamping rail including:
      a resilient vertical extension disposed generally parallel to said front face and extending upwards from a second edge of said base with a lip extending upwardly and outwardly from a top edge of said vertical extension, wherein said back portion, said base, and said vertical extension together define a channel, having a width, which receives an edge of said at least one case, and the width of said channel is less than the width of said case so that the clamping rail provides pressure on said case to securely retain said case against said front face when said case is placed therein whereby a top portion of said case leans against the wall surface thereby allowing a cover of said case to be viewed.

10. The combination as in claim 9, wherein a height of said back portion of each of said longitudinal rails extends above a height of a respective said clamping rail.

11. The combination of claim 9, comprising a plurality of compact disk cases.

12. The combination of claim 9, wherein said fastening means comprises threaded fasteners.

13. The combination of claim 9, wherein each of said longitudinal rails is made from plastic.

14. The combination of claim 9, wherein each of said longitudinal rails is made from spring steel.

15. The combination of claim 9, wherein said fastening means comprises adhesive.

\* \* \* \* \*